US006941909B2

(12) United States Patent
Robel et al.

(10) Patent No.: US 6,941,909 B2
(45) Date of Patent: Sep. 13, 2005

(54) SYSTEM AND METHOD FOR ACTUATING AN ENGINE VALVE

(75) Inventors: Wade James Robel, Normal, IL (US); Sean O. Cornell, Gridley, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/457,351

(22) Filed: Jun. 10, 2003

(65) Prior Publication Data

US 2004/0250783 A1   Dec. 16, 2004

(51) Int. Cl.$^7$ ................................................. F01L 1/34
(52) U.S. Cl. ................................ 123/90.16; 123/90.15; 123/90.12; 123/198 F
(58) Field of Search ..................... 123/90.12, 90.15, 123/90.16, 90.31, 90.14, 91.41, 198 F, 320–322, 123/90.22, 90.23, 90.4

(56) References Cited

U.S. PATENT DOCUMENTS

| | | | |
|---|---|---|---|
| 3,250,068 A | 5/1966 | Vulliamy | |
| 4,424,790 A | 1/1984 | Curtil | |
| 4,561,253 A | 12/1985 | Curtil | |
| 4,815,423 A | 3/1989 | Holmer | |
| 5,000,145 A * | 3/1991 | Quenneville | 123/321 |
| 5,012,778 A | 5/1991 | Pitzi | 123/321 |
| 5,408,979 A | 4/1995 | Backlund et al. | |
| 5,445,128 A | 8/1995 | Letang et al. | |
| 5,682,854 A | 11/1997 | Ozawa | |
| 5,927,075 A | 7/1999 | Khair | |
| 6,026,786 A | 2/2000 | Groff et al. | |
| 6,082,328 A | 7/2000 | Meistrick et al. | |

(Continued)

FOREIGN PATENT DOCUMENTS

JP    05106415 A2    4/1993

(Continued)

OTHER PUBLICATIONS

EDWARDS et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23-26, 1998, pp. 1-19.

(Continued)

Primary Examiner—Thomas Denion
Assistant Examiner—Kyle M. Riddle
(74) Attorney, Agent, or Firm—Finnegan, Henderson, Farabow, Garrett & Dunner

(57) ABSTRACT

An engine valve actuator is provided. The actuator includes an actuator housing that defines a tank adapted to store a supply of fluid and a bore in fluid communication with the tank. A piston is slidably disposed in the bore of the actuator housing. The piston is adapted to move between a first position and a second position where the piston selectively engages an engine valve. A mechanical biasing element acts on the piston to move the piston towards the second position. A control valve is disposed between the tank and the bore in the actuator housing. The control valve is moveable between a first position where fluid is allowed to flow between the tank and the bore and a second position where fluid is prevented from flowing between the bore and the tank to trap fluid in the bore. The trapped fluid prevents the piston from moving with respect to the actuator housing to thereby prevent the engine valve from moving to a closed position.

39 Claims, 6 Drawing Sheets

U.S. PATENT DOCUMENTS

| | | | |
|---|---|---|---|
| 6,085,705 A * | 7/2000 | Vorih | 123/90.12 |
| 6,170,441 B1 | 1/2001 | Haldeman et al. | |
| 6,209,516 B1 | 4/2001 | Yamashita | |
| 6,237,551 B1 | 5/2001 | Macor et al. | 123/90.15 |
| 6,253,730 B1 * | 7/2001 | Gustafson | 123/321 |
| 6,267,107 B1 | 7/2001 | Ward | |
| 6,273,076 B1 | 8/2001 | Beck et al. | |
| 6,279,550 B1 | 8/2001 | Bryant | |
| 6,301,887 B1 | 10/2001 | Gorel et al. | |
| 6,301,889 B1 | 10/2001 | Gladden et al. | |
| 6,302,076 B1 | 10/2001 | Bredy | |
| 6,467,452 B1 | 10/2002 | Duffy et al. | |
| 6,510,824 B2 * | 1/2003 | Vorih et al. | 123/321 |
| 6,571,765 B2 | 6/2003 | Kuboshima et al. | |
| 6,651,618 B1 | 11/2003 | Coleman et al. | |
| 6,655,349 B1 * | 12/2003 | Cavanagh | 123/321 |
| 6,668,773 B2 * | 12/2003 | Holtman et al. | 123/90.12 |
| 6,688,280 B2 | 2/2004 | Weber et al. | |

FOREIGN PATENT DOCUMENTS

| | | |
|---|---|---|
| JP | 2000120457 A | 4/2000 |
| JP | 2000145484 A | 5/2000 |
| WO | WO 98/02653 | 1/1998 |

OTHER PUBLICATIONS

OBERT, "Internal Combustion Engines and Air Pollution," Based on Internal Combustion Engines, Third Edition, 1973, pp. 612-614.

CHALLEN et al., "Diesel Engine Reference Book, Second Edition," SAE International, 1999, pp. 75, 81 84, 146, and 263-305.

Yorihiro Fukuzawa et al., "Development of High Efficiency Miller Cycle Gas Engine," Mitsubishi Heavy Industries, Ltd., Technical Review, vol. 38, No. 3, Oct. 2001, pp. 146-150.

Request for Inter Partes Reexamination Transmittal Form for U.S. Pat. No. 6,688,280, and Attachment to Request for Inter Partes Reexamination Transmittal Form, Sep. 17, 2004.

Request for Inter Partes Reexamination Transmittal Form for U.S. Pat. No. 6,651,618, and Attachment to Request for Inter Partes Reexamination Form, Aug. 27, 2004.

http://www.mazda.com.au/corpora/209.html, Oct. 16, 2001, pp. 1-6.

* cited by examiner

SYSTEM AND METHOD FOR ACTUATING AN ENGINE VALVE

TECHNICAL FIELD

The present invention is directed to a system and method for actuating an engine valve and, more particularly, to an actuator for an engine valve actuation system.

BACKGROUND

The operation of an internal combustion engine, such as, for example, a diesel, gasoline, or natural gas engine, may cause the generation of undesirable emissions. These emissions, which may include particulates and oxides of nitrogen (NOx), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches, such as, for example, engine gas recirculation and aftertreatments, have been found to reduce the amount of emissions generated during the operation of an engine. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston. Implementing a timing variation, such as the late-intake Miller cycle, may improve the overall efficiency of the engine.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation.

An engine valve actuation system may include a hydraulic actuator that is adapted to vary the valve actuation timing established by the shape of the cam. For example, as described in U.S. Pat. No. 6,237,551 to Macor et al., issued on May 29, 2001, an engine valve actuation system may include a hydraulic actuator that establishes a hydraulic link between the cam and the intake valve. When the link is established, the valve will be actuated according to the shape of the cam. However, when the hydraulic link is broken, such as by opening a control valve, the force of a valve return spring causes the engine valve to close. Thus, breaking the hydraulic link allows the engine valve to close at a different timing than would be achieved by the shape of the cam.

These types of hydraulic actuators typically use engine lubricating oil as the operating fluid. Lubricating oil may be supplied to the hydraulic actuator by a standard engine lubrication system. However, the lubricating oil may become contaminated with dirt, or debris, as the lubricating oil is circulated through the engine. Any such contamination of the lubricating oil may lead to degraded performance of the hydraulic actuator, which may translate to a reduction in the overall efficiency of the engine.

In addition, the operation of the hydraulic actuator may depend upon the viscosity of the lubricating oil. When the lubricating oil is cold, such as when the engine is starting, the hydraulic actuator may experience slow response times. Depending upon the current environmental conditions, the engine may need to operate for a period of time to warm the lubricating oil so that the hydraulic actuator will operate as expected. The engine may experience rough running conditions or difficulty starting until the lubricating oil is warmed enough to allow the hydraulic actuator to operate properly.

The engine valve actuation system of the present invention solves one or more of the problems set forth above.

SUMMARY OF THE INVENTION

In one aspect, the present invention is directed to an engine valve actuator. The actuator includes an actuator housing that defines a tank adapted to store a supply of fluid and a bore in fluid communication with the tank. A piston is slidably disposed in the bore of the actuator housing. The piston is adapted to move between a first position and a second position where the piston selectively engages an engine valve. A mechanical biasing element acts on the piston to move the piston towards the second position. A control valve is disposed between the tank and the bore in the actuator housing. The control valve is moveable between a first position where fluid is allowed to flow between the tank and the bore and a second position where fluid is prevented from flowing between the bore and the tank to trap fluid in the bore. The trapped fluid prevents the piston from moving with respect to the actuator housing to thereby prevent the engine valve from moving to a closed position.

In another aspect, the present invention is directed to a method of actuating an engine valve. A cam assembly is operated to move an engine valve between a first position where the engine valve prevents a flow of fluid and a second position where the engine valve allows a flow of fluid. A piston is extended from an actuator housing to operatively engage the engine valve. A flow of fluid is directed from a tank in the actuator housing to a bore in the actuator housing. The bore is associated with the piston. Fluid is prevented from flowing from the bore to the tank to trap fluid in the bore and prevent the piston from moving with respect to the actuator housing. The piston engages the engine valve to prevent the engine valve from returning to the first position.

DETAILED DESCRIPTION

Figure 1:
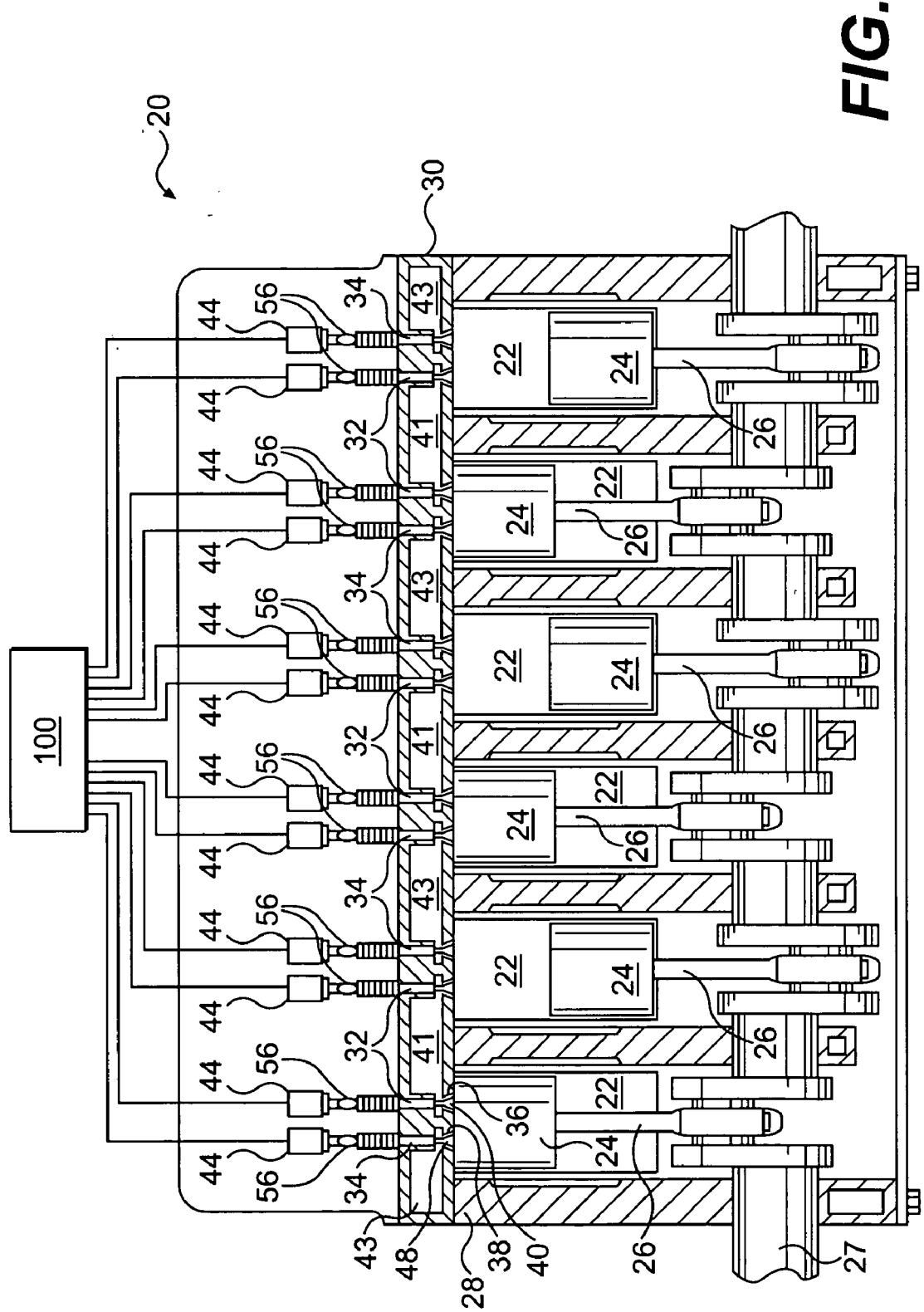
FIG. 1 is a diagrammatic cross-sectional view of an exemplary embodiment of an internal combustion engine.

An exemplary embodiment of an internal combustion engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 1, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" configuration, a "V" configuration, or any other conventional configuration.

As also shown in FIG. 1, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to move or "lift" valve element 40 to thereby open the respective intake port 36. In a cylinder 22 having a pair of intake ports 36 and a pair of intake valves 32, the pair of intake valves 32 may be actuated by a single valve actuation assembly or by a pair of valve actuation assemblies.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to move or "lift" valve element 48 to thereby open the respective exhaust port 38. In a cylinder 22 having a pair of exhaust ports 38 and a pair of exhaust valves 34, the pair of exhaust valves 34 may be actuated by a single valve actuation assembly 44 or by a pair of valve actuation assemblies 44.

Figure 2:
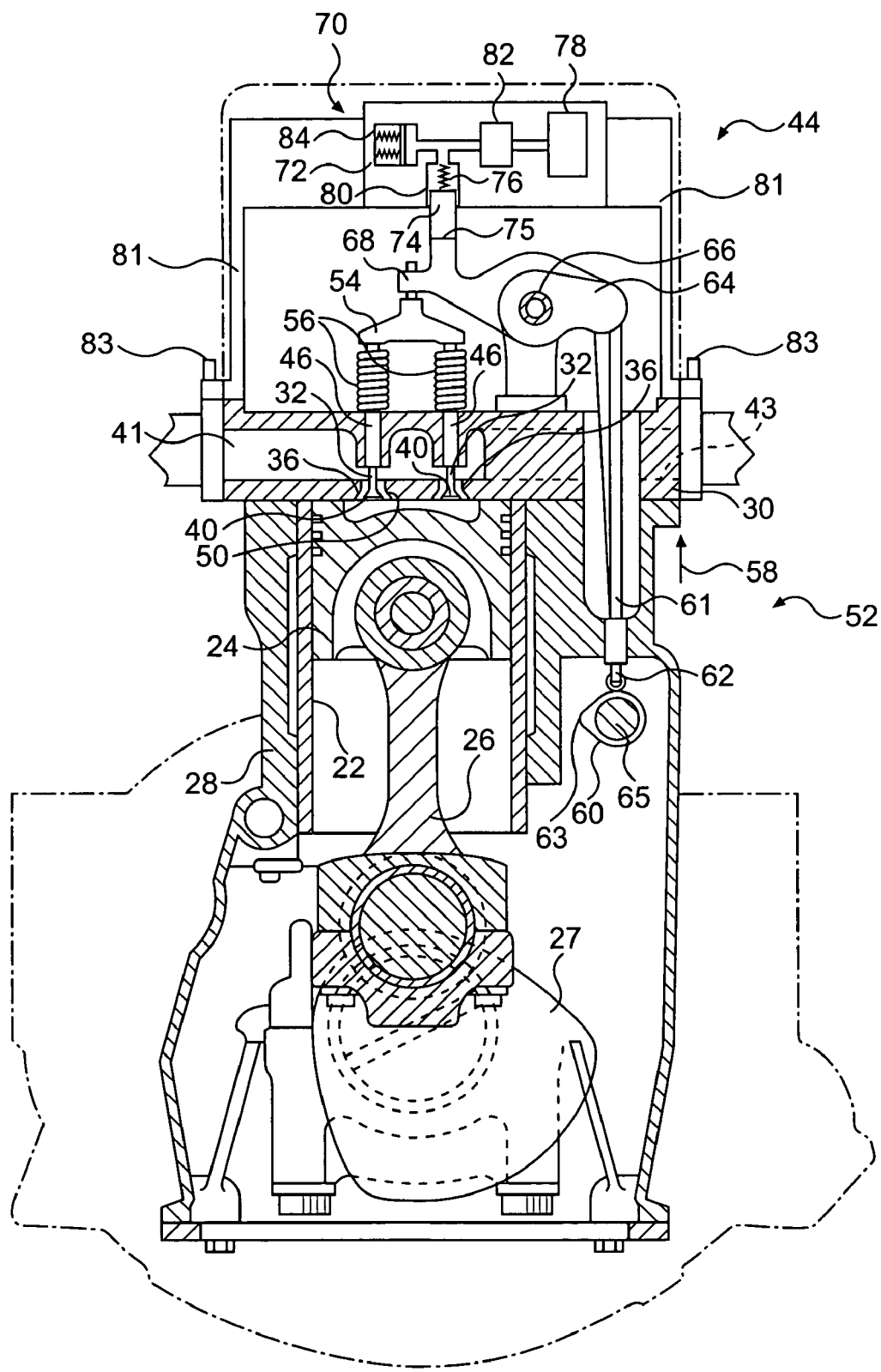
FIG. 2 is a diagrammatic cross-sectional view of a cylinder and valve actuation assembly in accordance with an exemplary embodiment of the present invention.

FIG. 2 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As also shown in FIG. 2, a valve actuation assembly 44 is operatively associated with intake valves 32. Valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 2, the cam assembly 52 includes a cam 60 having a cam lobe 63 and mounted on a cam shaft 65, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear train assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is moving from a top-dead-center position towards a bottom-dead-center position in an intake stroke to allow air to flow from intake passageway 41 into cylinder 22.

A similar valve actuation assembly may be connected to exhaust valves 34. A second cam (not shown) may be connected to crankshaft 27 to control the actuation timing of exhaust valves 34. Exhaust valves 34 may be actuated to open exhaust ports 38 when piston 24 is moving from a bottom-dead-center position towards a top-dead-center position to allow exhaust to flow from cylinder 22 into exhaust passageway 43.

As shown in FIG. 2, valve actuation assembly 44 may also include an actuator 70. Actuator 70 includes a housing 72 that slidably receives a piston 74 having an end 75. End 75 of piston 74 is adapted to engage end 68 of rocker arm 64. One skilled in the art will recognize that end 75 of piston may engage another portion of rocker arm or may be operatively engaged with valve actuation assembly 44 in another way.

Figure 3:
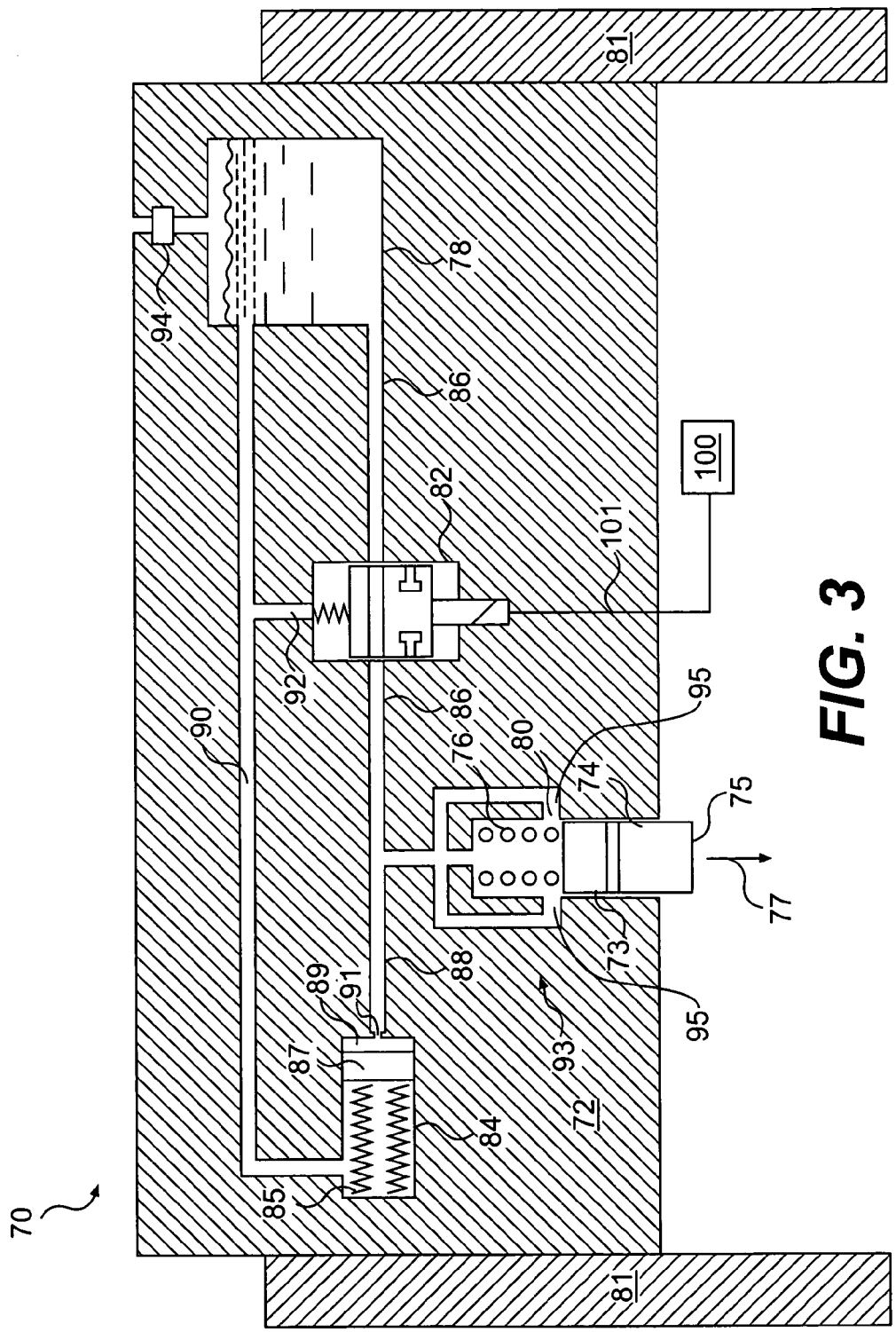
FIG. 3 is a schematic and diagrammatic cross-sectional representation of an actuator for an engine valve in accordance with an exemplary embodiment of the present invention.

As schematically shown in FIG. 3, housing 72 of actuator 70 defines a tank 78. Tank 78 is adapted to store a supply of fluid. Tank 78 may store any type of fluid such as, for example, an engine lubricating oil.

Housing 72 of actuator 70 also defines a bore 80 that is adapted to slidably receive piston 74. A seal 73 may be disposed between piston 74 and bore 80. Seal 73 may be any type of sealing element adapted to prevent fluid from escaping from bore 80 past piston 74.

A mechanical biasing means may be disposed in bore 80. The mechanical biasing means acts on piston 74 to bias piston 74 away from housing 72, i.e. in the direction of arrow 77. The mechanical biasing means may be any mechanical biasing element, such as, for example, a spring 76, that is adapted to bias piston 74 away from housing 72. The force exerted by the mechanical biasing means may be less than the force exerted by springs 56 (referring to FIG. 2) on bridge 54.

Housing 72 of actuator 70 also defines a fluid passageway 86 that connects tank 78 and bore 80. Fluid passageway 86 provides a fluid connection that allows fluid to flow between the tank 78 and the bore 80. For example, fluid may flow from tank 78 to bore 80 as spring 76 biases piston 74 away from housing 72.

A control valve 82 may be disposed in fluid passageway 86. Control valve 82 may be moved between a first position where fluid is allowed to flow through fluid passageway 86 and a second position, where fluid is prevented from flowing through fluid passageway 86. Thus, by controlling the position of control valve 82, the rate of fluid flow between the tank 78 and the bore 80 may be controlled.

A snubbing valve 93 may be disposed in the fluid line between bore 80 and control valve 82. Snubbing valve 93 may be configured to decrease the rate at which fluid exits bore 80 to thereby slow the rate at which piston 74 moves within bore 80. Snubbing valve 93 may include one or more passageways 95 having openings that connect bore 80 with the fluid line leading to control valve 82.

A bleed valve 94 may be disposed in housing 72. Bleed valve 94 may be adapted to allow air, or any other gas, that finds it way into tank 78 to be released from tank 78. This will prevent air from being passed from tank 78 to bore 80. Bleed valve 94 may also purge air from anywhere in actuator 70.

Figure 4:
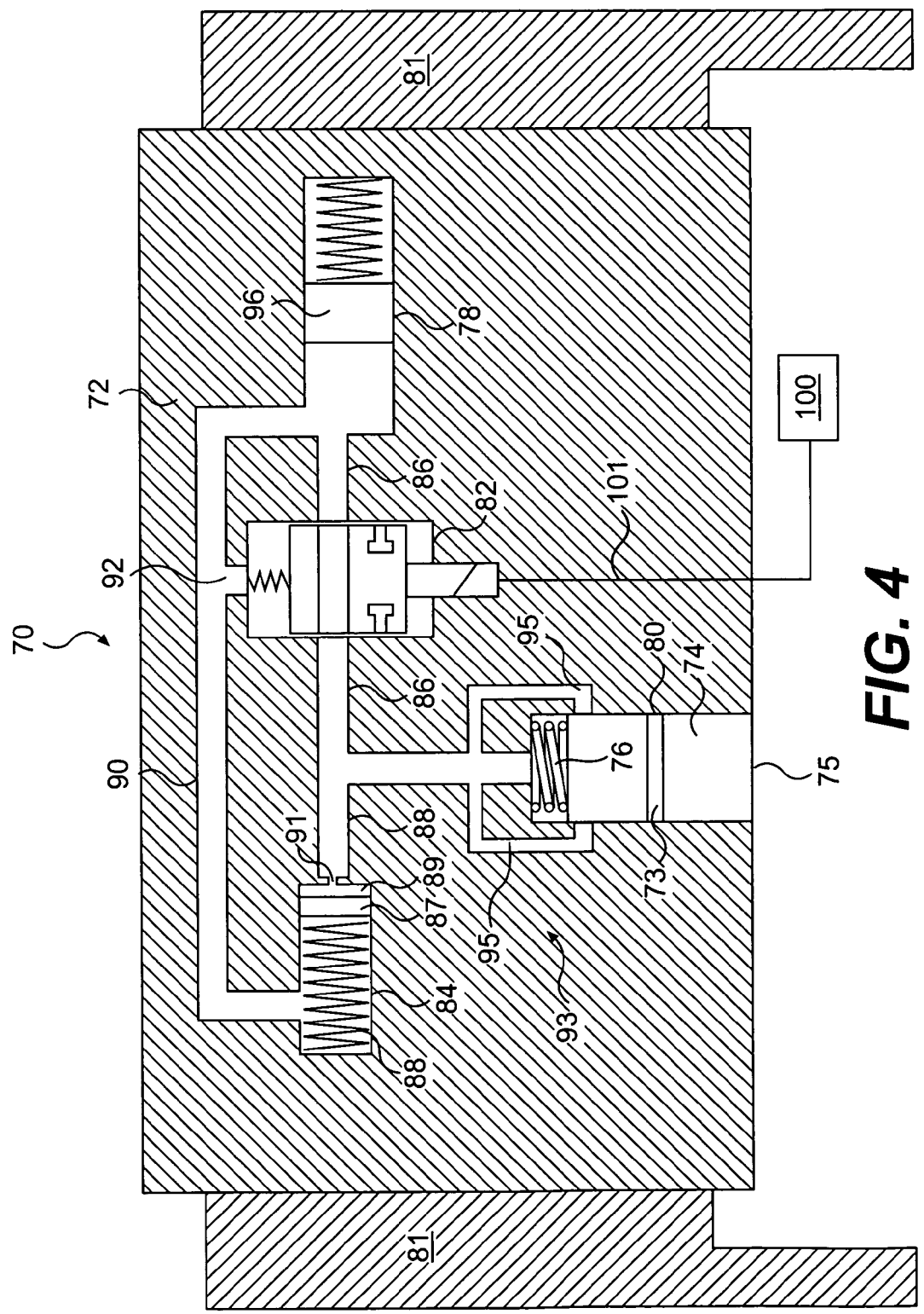
FIG. 4 is a schematic and diagrammatic cross-sectional representation of an actuator for an engine valve in accordance with an exemplary embodiment of the present invention.
Figure 5:
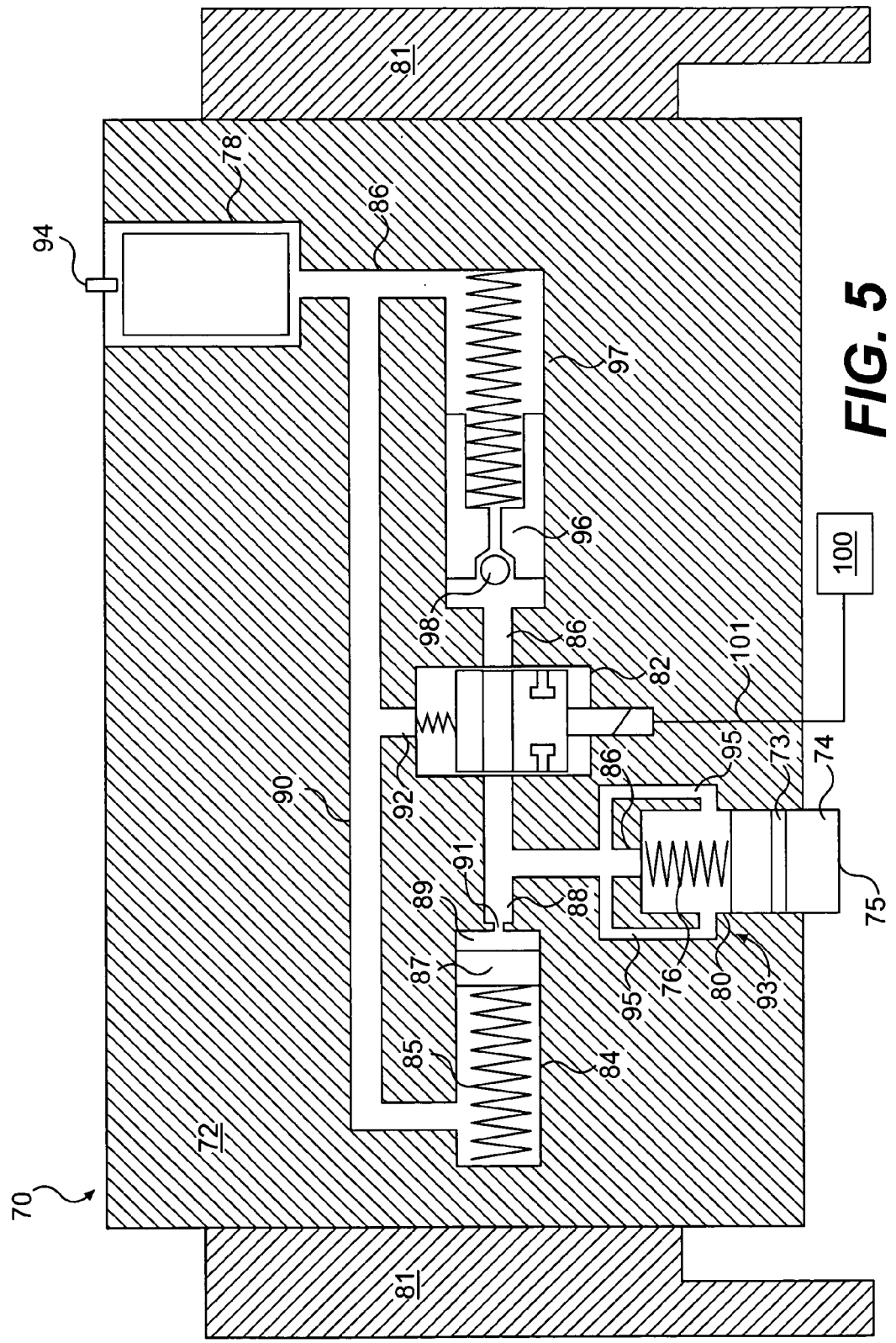
FIG. 5 is a schematic and diagrammatic cross-sectional representation of an actuator for an engine valve in accordance with an exemplary embodiment of the present invention.

Actuator 70 may also include an accumulator 84. As shown in FIGS. 3–5, accumulator 84 may include a piston 87 disposed in a chamber 89. A spring 85 may act on piston 87. Fluid entering chamber 89 may act to move piston 87 and compress spring 85 if the force exerted by the fluid on piston 87 is great enough to overcome the force of spring 85. Spring 85 may act to move piston 87 and force fluid out of chamber 89 when the force of spring 85 is greater than the force exerted by the pressurized fluid on piston 87.

A fluid passageway 88 may connect accumulator 84 to fluid passageway 86 between the tank 78 and the bore 80. A restrictive orifice 91 may be disposed in an inlet to accumulator 84. As described in greater detail below, accumulator 84 may act to dampen oscillations in bore 80 and fluid passageway 86, which may cause piston 74 to oscillate relative to housing 72.

Housing 72 of actuator 70 also includes one or more leak passageways 90 and 92. Leak passageways 90 and 92 may be adapted to allow fluid that leaks from either control valve 82 or accumulator 84 to return to tank 78. As described in greater detail below, both control valve 82 and accumulator 84 may be exposed to fluid having a substantial pressure. Leak passageway 90 and 92 may help prevent any fluid that leaks through control valve 82 or accumulator 84 from leaking from actuator 70.

As illustrated in FIG. 4, a spring loaded piston 96 may be disposed in tank 78. Spring loaded piston 96 may act to exert a force on fluid contained in tank 78. The force of piston 96 may act to increase the pressure of the fluid in tank 78 and to thereby move fluid through fluid passageway 86 to bore 80.

As shown in FIG. 5, housing 72 of actuator 70 may include a third chamber 97 disposed between tank 78 and control valve 82. Chamber 97 may include spring loaded piston 96. A check valve 98 may be disposed in piston 96. Check valve 98 may be configured to allow fluid to flow from tank 78 towards bore 80. In this manner, check valve 98 is adapted to allow for the replacement of fluid that may leak from actuator 70.

As shown in FIG. 2, housing 72 of actuator 70 may be connected to cylinder head 30. For example, a pair of supports 81 may extend from housing 72 to cylinder head 30. Supports 81 may be attached to cylinder head 30 by any connecting member readily apparent to one skilled the art. For example, bolts 83 may connect supports 81 to cylinder head 30.

As shown in FIG. 1, a controller 100 is connected to control valve 82 in each valve actuation assembly 44. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control the valve actuation assembly, the fuel injection system, and any other function readily apparent to one skilled in the art. Controller 100 may control engine 20 based on the current operating conditions of the engine and/or instructions received from an operator. As shown in FIGS. 3–5, controller 100 is connected to control valve 82 in actuator housing 72 through a lead 101.

Controller 100 may be further programmed to receive information from one or more sensors operatively connected with engine 20. Each of the sensors may be configured to sense one or more operational parameters of engine 20. One skilled in the art will recognize that many types of sensors may be used in conjunction with engine 20. For example, engine 20 may be equipped with sensors configured to sense one or more of the following: the temperature of the engine coolant, the temperature of the engine, the ambient air temperature, the engine speed, the load on the engine, the intake air pressure, the position of the piston relative to the cylinder, and the pressure in the cylinder.

Figure 6:
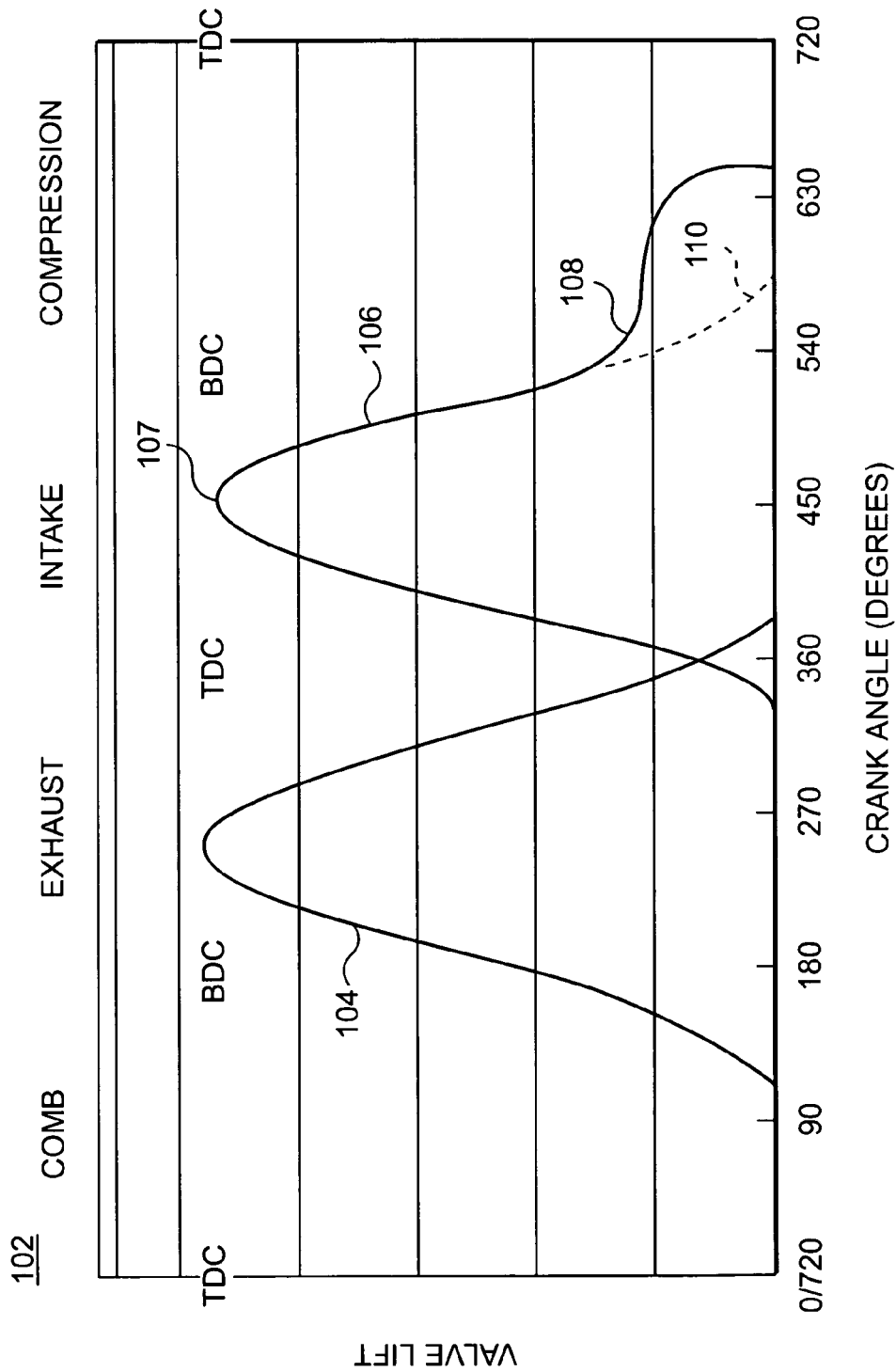
FIG. 6 is a graphic illustration of an exemplary valve actuation as a function of engine crank angle for an engine operating in accordance with the present invention.

Engine 20 may be further equipped with a sensor configured to monitor the crank angle of crankshaft 27 to thereby determine the position of pistons 24 within their respective cylinders 22. The crank angle of crankshaft 27 is also related to actuation timing of intake valves 32 and exhaust valves 34. An exemplary graph 102 indicating the relationship between valve actuation timing and crank angle is illustrated in FIG. 6. As shown by graph 102, the exhaust valve lift 104 is timed to substantially coincide with the exhaust stroke of piston 24 and the intake valve lift 106 is timed to substantially coincide with the intake stroke of piston 24.

INDUSTRIAL APPLICABILITY

Based on information provided by the engine sensors, controller 100 may operate control valve 82 in each valve actuation assembly 44 to control the actuation timing of the valves of engine 20. For example, under certain operating conditions, controller 100 may implement a late intake Miller cycle in each cylinder 22 of engine 20. Under normal operating conditions, implementation of the late intake Miller cycle may increase the overall efficiency of the engine 20. However, under some operating conditions, such as, for example, when engine 20 is cold, controller 100 may operate engine 20 on a conventional diesel cycle.

The following discussion describes the implementation of a late intake Miller cycle in a single cylinder 22 of engine 20. One skilled in the art will recognize that the system of the present invention may be used to selectively implement a late intake Miller cycle in all cylinders of engine 20 in the same or a similar manner. In addition, the system of the present invention may be used to implement other valve actuation variations on the conventional diesel cycle, such as, for example, exhaust gas re-circulation system.

Controller 100 may implement a late intake valve closing Miller cycle for a particular cylinder 22 by controlling the position of control valve 82 in valve actuation assembly 44. The rotation of cam 60 causes rocker arm 64 to pivot to thereby actuate intake valves 32. The force of spring 76 causes piston 74 to extend in the direction of arrow 77 (referring to FIG. 3), to thereby follow the motion of end 68 of rocker arm 64.

The movement of piston 74 in bore 80 draws fluid into bore 80 from fluid passageway 86 and tank 78. The flow of fluid into bore 80 may be aided by spring-loaded piston 96, which may be disposed in tank 78 (as shown in FIG. 4) or in chamber 97 (as shown in FIG. 5). Spring-loaded piston 96 may act to force fluid through fluid passageway 86 into bore 80 to ensure that bore 80 is filled with fluid.

Controller 100 may send a signal to adjust the position of control valve 82 to close passageway 86 and thereby trap fluid in bore 80 when piston 74 is fully extended from housing 72. For example, controller 100 may close control valve 82 when intake valve 32 is at or near a maximum lift position, such as, for example, a peak 107 (referring to FIG. 6) distance. Also, controller 100 may time the closing of control valve 82 to ensure that bore 80 is filled with fluid before control valve 82 is moved to the closed position.

As cam 60 continues to rotate, springs 56 urge intake valves 32 towards their closed position until end 68 of rocker arm 64 engages end 75 of piston 74. The fluid trapped in bore 80 will prevent piston 74 from moving with respect to housing 72 and will, therefore, prevent intake valves 32 from closing. As long as control valve 82 remains in the closed position, the trapped fluid in bore 80 will prevent springs 56 from returning intake valves 32 to the closed position. Thus, actuator 70 will hold intake valves 32 in the open position, independently of the action of cam assembly 52.

When rocker arm 64 engages piston 74, the force of springs 56 acting through rocker arm 64 may cause an increase in the pressure of the fluid within actuator 70. In response to the increased pressure, fluid will flow through restrictive orifice 91 in passageway 88 and into accumulator 84, which may absorb the pressure spike. In this manner, accumulator 84 may act to dampen any oscillations that may result from the engagement of rocker arm 64 and piston 74.

Controller 100 may close intake valves 32 by sending a signal to adjust the position of control valve 82 to open passageway 86. This allows the trapped fluid to flow out of bore 80. The force of springs 56 overcomes the force of spring 76 and forces the fluid from bore 80 towards tank 78. The release of the trapped fluid allows piston 74 to move within housing 72. This allows rocker arm 64 to pivot so that intake valves 32 are moved to the closed position.

Snubbing valve 93 may reduce the rate at which intake valve 32 moves to the closed position. As piston 74 moves within bore 80, fluid flows through passageways 95. The body of piston 74 will eventually block the openings to passageways 95, thereby reducing the rate at which fluid flows from bore 80. This reduction in fluid flow rate translates to a reduction in velocity of piston 74 and to a reduction in the closing, or seating, velocity of intake valves 32. In this manner, snubbing valve 93 controls the velocity at which intake valves 32 close to prevent the intake valves 32 from being damaged.

An exemplary late intake closing 108 is illustrated in FIG. 6. As shown, the intake valve actuation 106 is extended into a portion of the compression stroke of piston 24. This allows some of the air in cylinder 22 to escape as piston 24 begins the compression stroke. The amount of air allowed to escape cylinder 22 may be controlled by adjusting the crank angle at which control valve 82 is opened. Control valve 82 may be opened at an earlier crank angle to decrease the amount of escaping air or at a later crank angle to increase the amount of escaping air.

Certain operating conditions may require that engine 20 be operated on a conventional diesel cycle instead of the late intake Miller cycle described above. These types of operating conditions may be experienced, for example, when engine 20 is first starting or is otherwise operating under cold conditions. The described valve actuation system 44 allows for the selective disengagement of the late intake Miller cycle.

Controller 100 may disengage the late intake Miller cycle by leaving control valve 82 in the open position. If control valve 82 is continuously open, no fluid will be trapped in bore 80. Accordingly, piston 74 will be free to move within housing 72 and will not prevent intake valves 32 from returning to the closed position. Thus, the actuation of intake valves 32 will be driven by the shape of cam 60.

Thus, when control valve 82 is continuously open, intake valves 32 will follow a conventional diesel cycle as governed by cam 60. As shown in FIG. 6, intake valve actuation 106 will follow a conventional closing 110. In the conventional closing 110, the closing of intake valves 32 substantially coincides with the end of the intake stroke of piston 24. When intake valves 32 close at the end of the intake stroke, no air will be forced from cylinder 22 during the compression stroke. This results in piston 24 compressing the fuel and air mixture to a higher pressure, which will facilitate diesel fuel combustion. This is particularly beneficial when engine 20 is operating in cold conditions.

As will be apparent from the foregoing description, the described system provides an engine valve actuation system that may selectively alter the timing of the intake and/or exhaust valve actuation of an internal combustion engine. The actuation of the engine valves may be based on sensed operating conditions of the engine. For example, the engine valve actuation system may implement a late intake Miller cycle when the engine is operating under normal operating conditions. The late intake Miller cycle may be disengaged when the engine is operating under adverse operating conditions, such as when the engine is cold. Thus, the disclosed system and method provide a flexible engine valve actuation system that provides for both enhanced cold starting capability and fuel efficiency gains.

The disclosed system and method also provides an engine valve actuator that is self-contained in a single housing. All essential elements of the actuator are contained in the housing, including the fluid supply reservoir. As the actuator does not have to share fluid with another system in the engine, the possibility of operating fluid contamination is reduced. Also, the actuator may use any type of operating fluid, including a fluid that is not affected by a change in temperature. Thus, the disclosed actuator may not experience performance problems when the operating fluid is cold.

In addition, the described hydraulic actuator does not rely upon oil from the engine lubrication system. Accordingly, any contamination of the lubricating oil will not affect the operation of the hydraulic actuator. Also, as the amount of fluid stored in the actuator is substantially less than the amount of oil included in the engine lubrication system, the fluid in the described actuator may reach a normal operating temperature faster than the oil in the engine lubricating system. Thus, the described actuator may provide for reliable and timely operation, even under undesirable operating conditions.

It will be apparent to those skilled in the art that various modifications and variations can be made in the described engine valve actuation system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An engine valve actuator, comprising:
    an actuator housing defining a tank adapted to store a supply of fluid and a bore in fluid communication with the tank;
    a piston slidably disposed in the bore of the actuator housing, the piston adapted to move between a first position and a second position where the piston engages an engine valve;
    a mechanical biasing element acting on the piston to move the piston towards the second position; and
    a control valve disposed between the tank and the bore in the actuator housing, the control valve selectively moveable between a first position where fluid is allowed to flow between the tank and the bore and a second position where fluid is prevented from flowing between the bore and the tank to trap fluid in the bore, the trapped fluid preventing the piston from moving with respect to the actuator housing to thereby prevent the engine valve from returning to a closed position.

2. The actuator of claim 1, wherein the mechanical biasing element is a spring.

3. The actuator of claim 1, further including:
    an accumulator disposed in the actuator housing and in fluid connection with the tank and the bore; and
    a restrictive orifice disposed at the inlet to the accumulator.

4. The actuator of claim 3, further including a first leak passageway connecting the accumulator with the tank.

5. The actuator of claim 4, further including a second leak passageway connecting the control valve with the tank.

6. The actuator of claim 1, further including an air-bleed valve adapted to allow air to escape from the tank.

7. The actuator of claim 1, wherein the tank includes a spring-loaded piston.

8. The actuator of claim 1, wherein the actuator housing defines a chamber between the tank and the bore and wherein the chamber includes a spring-loaded piston.

9. The actuator of claim 8, further including a check valve disposed in the chamber and adapted to allow fluid to flow from the tank towards the bore.

10. The actuator of claim 1, further including a snubbing valve adapted to slow a seating velocity of the piston.

11. The engine valve actuator of claim 1, wherein preventing the engine valve from returning to a closed position extends an engine valve lift period.

12. The engine valve actuator of claim 1, wherein preventing the engine valve from returning to a closed position increases an average valve lift height during a valve lift period.

13. An engine valve actuator, comprising:
    an actuator housing defining a tank adapted to store a supply of fluid and a bore in fluid communication with the tank;
    a piston slidably disposed in the bore of the actuator housing and moveable between a first position and a second position where the piston engages an engine valve;
    a mechanical biasing means for moving the piston relative towards the second position; and
    a flow control means for controlling a flow of fluid between the tank and the bore, the flow control means adapted to selectively prevent the flow of fluid between the tank and the bore to trap fluid in the bore, the trapped fluid preventing the piston from moving with respect to the actuator housing to thereby prevent the engine valve from returning to a closed position.

14. The actuator of claim 13, wherein the mechanical biasing means is a spring disposed between the piston and the actuator housing, the spring adapted to bias the piston into operative engagement with the engine valve.

15. The actuator of claim 13, further including a means for dampening pressure fluctuations in a fluid passageway connecting the tank and the bore.

16. The actuator of claim 13, wherein the flow control means is a control valve moveable between a first position where fluid is allowed to flow between the tank and the bore and a second position where fluid is prevented from flowing between the bore and the tank.

17. The engine valve actuator of claim 13, wherein preventing the engine valve from returning to a closed position extends an engine valve lift period.

18. The engine valve actuator of claim 13, wherein preventing the engine valve from returning to a closed position increases an average valve lift height during a valve lift period.

19. A method of actuating an engine valve, comprising:
operating a cam assembly to move an engine valve between a first position where the engine valve prevents a flow of fluid and a second position where the engine valve allows a flow of fluid;
extending a piston from an actuator housing to engage the engine valve;
directing a flow of fluid from a tank disposed within the actuator housing to a bore in the actuator housing, the bore being associated with the piston; and
selectively preventing fluid from flowing from the bore to the tank to trap fluid in the bore and prevent the piston from moving with respect to the actuator housing, the piston engaging the engine valve to prevent the engine valve from returning to the first position.

20. The method of claim 19, further including allowing fluid to flow from the bore to the tank to release the piston and thereby allow the engine valve to return to the first position.

21. The method of claim 20, wherein fluid is allowed to flow from the bore to the tank after a predetermined period of time.

22. The method of claim 19, further including directing a portion of the flow of fluid between the tank and the bore to an accumulator.

23. The engine valve actuator of claim 19, wherein preventing the engine valve from returning to a closed position extends an engine valve lift period created by the cam assembly.

24. The engine valve actuator of claim 19, wherein preventing the engine valve from returning to a closed position increases an average valve lift height during a valve lift period created by the cam assembly.

25. An engine valve actuation system, comprising:
an engine valve moveable between a first position where the engine valve prevents a flow of fluid and a second position where the engine valve allows a flow of fluid;
a spring acting on the engine valve to move the engine valve towards the first position;
a cam assembly operatively connected to the engine valve to move the engine valve between the first position and the second position;
an actuator housing defining a tank adapted to store a supply of fluid and a bore in fluid communication with the tank;
a piston slidably disposed in the bore of the actuator housing, the piston adapted to engage the engine valve;
a mechanical biasing element acting on the piston to move the piston to operatively engage the engine valve; and
a control valve disposed between the tank and the bore in the actuator housing, the control valve selectively moveable between a first position where fluid is allowed to flow between the tank and the bore and a second position where fluid is prevented from flowing from the bore to the tank to trap fluid in the bore, the trapped fluid preventing the piston from moving with respect to the actuator housing to thereby prevent the engine valve from returning to the first position.

26. The engine valve actuation system of claim 25, wherein the mechanical biasing element is a spring.

27. The engine valve actuation system of claim 25, further including an accumulator disposed in the actuator housing and in fluid connection with the tank and the bore.

28. The engine valve actuation system of claim 25, further including an air-bleed valve adapted to allow air to escape from the tank.

29. The engine valve actuation system of claim 25, wherein the tank includes a spring-loaded piston.

30. The engine valve actuation system of claim 25, wherein the actuator housing defines a chamber between the tank and the bore and wherein the chamber includes a spring loaded piston.

31. The engine valve actuation system of claim 30, further including a check valve disposed in the chamber and adapted to allow fluid to flow from the tank towards the bore.

32. The engine valve actuation system of claim 25, further including a pair of supports adapted to secure the actuator housing to a cylinder head.

33. The engine valve actuator of claim 25, wherein preventing the engine valve from returning to a closed position extends an engine valve lift period created by the cam assembly.

34. The engine valve actuator of claim 25, wherein preventing the engine valve from returning to a closed position increases an average valve lift height during a valve lift period created by the cam assembly.

35. A self-contained engine valve actuation arrangement adapted to selectively engage an engine valve moveable relative to a cylinder head:
an actuator housing defining a tank containing a closed supply of fluid and a bore in fluid communication with the tank, the actuator being fixed to the cylinder head;
a piston slidably disposed in the bore of the actuator housing, the piston adapted to move between a first position and a second position where the piston engages an engine valve;
a mechanical biasing element acting on the piston to move the piston towards the second position; and
a control valve disposed between the tank and the bore in the actuator housing, the control valve selectively moveable between a first position where fluid is allowed to flow between the tank and the bore and a second position where fluid is prevented from flowing between the bore and the tank to trap fluid in the bore, the trapped fluid preventing the piston from moving with respect to the actuator housing to thereby prevent the engine valve from returning to a closed position.

36. The arrangement of claim 35, further including a support structure connecting the actuator housing to the cylinder head.

37. The arrangement of claim 36, wherein the support structure is bolted to the cylinder head.

38. The engine valve actuator of claim 35, wherein preventing the engine valve from returning to a closed position extends an engine valve lift period.

39. The engine valve actuator of claim 35, wherein preventing the engine valve from returning to a closed position increases an average valve lift height during a valve lift period.

* * * * *